United States Patent [19]

Horton

[11] 4,319,807
[45] Mar. 16, 1982

[54] ROTATING OPTICAL FREQUENCY CHIRP DEVICE

[75] Inventor: James A. Horton, Kennewick, Wash.

[73] Assignee: Jersey Nuclear-Avco Isotopes, Inc., Bellevue, Wash.

[21] Appl. No.: 133,406

[22] Filed: Mar. 24, 1980

[51] Int. Cl.³ .............................................. G02B 27/17
[52] U.S. Cl. ....................................... 350/6.4; 307/425
[58] Field of Search ................. 331/94.5 M, 94.5 C; 350/6.2, 6.4, 46, 47; 250/284, 493, 29; 176/14; 423/249; 23/230.3

[56] References Cited

U.S. PATENT DOCUMENTS

| | | | |
|---|---|---|---|
| 3,611,182 | 12/1972 | Treacy | 331/94.5 C |
| 3,614,212 | 10/1971 | Hock | 350/6.4 |
| 3,772,519 | 11/1973 | Leog et al. | 250/289 |
| 4,088,898 | 5/1978 | Stitch | 331/94.5 |

FOREIGN PATENT DOCUMENTS 52-26845  2/1977  Japan ..................... 350/47

Primary Examiner—John K. Corbin
Assistant Examiner—Rebecca Gass
Attorney, Agent, or Firm—Weingarten, Schurgin & Gagnebin

[57] ABSTRACT

A system for generating pulses of laser radiation which vary in frequency with time to achieve a chirp or frequency sweep in which single or multiple laser spectra in the form of mode lines are displaced or shifted in frequency during the generation of the laser pulse. The system provides for the mode line shift through the use of an optical wedge which moves transversely through one of the optical paths utilized in the optical loop to generate the laser pulse. This provides a linear increase with time in the optical path length so as to perturb the wavelength of oscillation of the laser output, which results in a linear chirp. In a preferred embodiment a number of prisms of optically dense material with a wedge-like profile are mounted on a rotating disc. When the disc with the prisms is interposed in the optical loop of an injection locked laser oscillator, successive prisms traverse the laser's optical loop. In a further embodiment, pairs of identically configured optical elements are located on diametrically opposite sides of the rotating disc so as to remove any beam position jitter introduced by shaft wobble, prism misalignment or refraction angle changes due to input beam angle deviation, with the second prism of the pair cancelling errors introduced by the first prism of the pair. To further reduce errors, all prisms are positioned at the point of minimum deviation.

33 Claims, 9 Drawing Figures

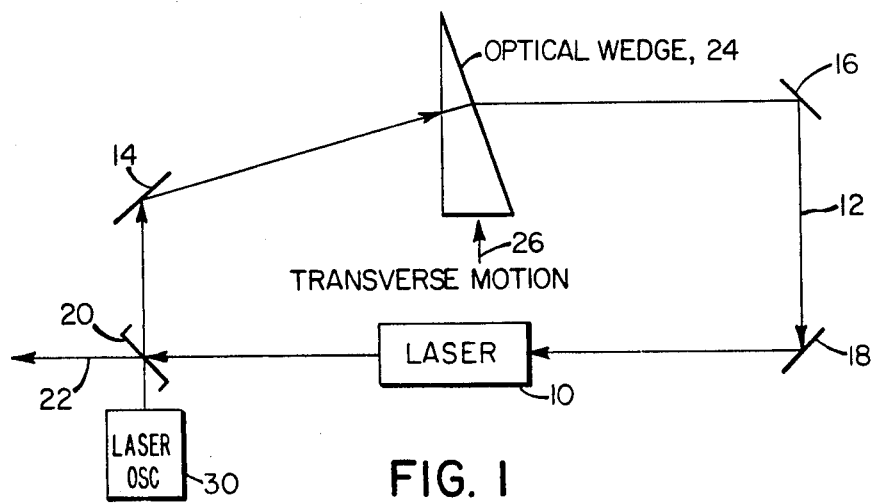
FIG. 1
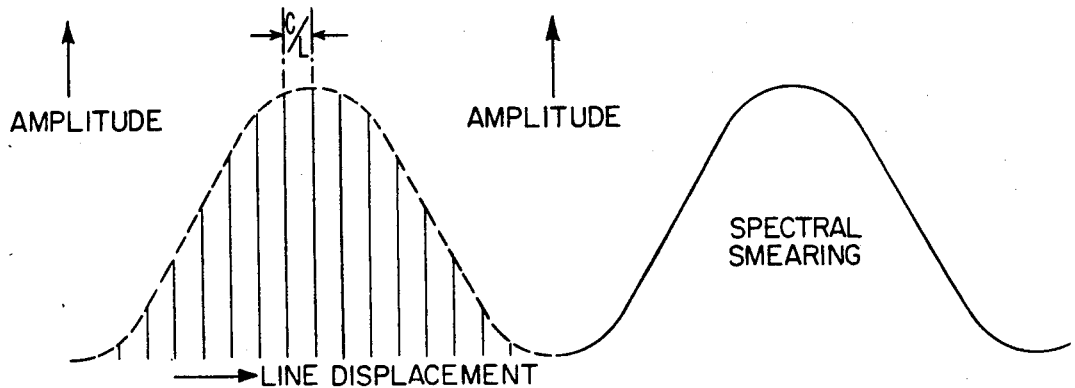
FIG. 2
FIG. 3
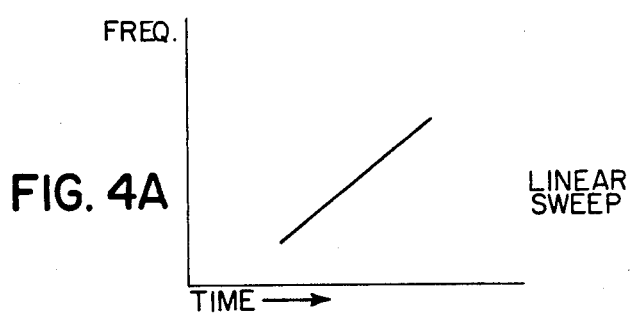
FIG. 4A
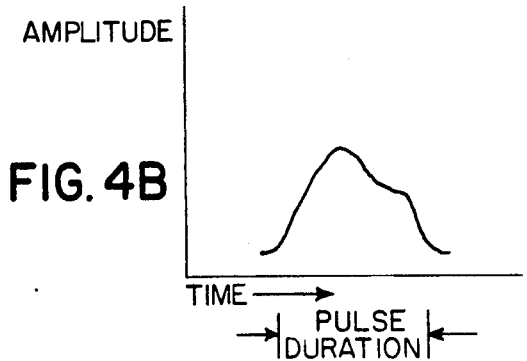
FIG. 4B

ROTATING OPTICAL FREQUENCY CHIRP DEVICE

FIELD OF THE INVENTION

The present invention is concerned with providing frequency chirps of the spectra from either single mode or multi-mode laser sources and more particularly a translating optical wedge to provide spectral chirping.

BACKGROUND OF THE INVENTION

Multi-mode lasers having outputs with a large number of frequency or spectral components called mode lines have been utilized in the past for a variety of applications. Whether these lasers are mode locked or not, the existence of multiple modes results in output pulses from the lasers having discrete or distinct spectra at closely spaced frequencies surrounding the spectral line to which the laser is originally tuned. While in most applications production of a comb-like spectral response is not only important but is often times sought, in some applications it is desirable to displace or shift the spectra of the output signal from the laser during the production of a laser pulse so that the output signal appears to have a continuous frequency spectrum to either side of the frequency to which the laser is tuned. In this technique, the mode lines are in effect "smeared out" to give the pulse an energy vs. frequency continuum.

This smearing out of the spectra in multi-mode lasers is important in certain types of isotope separation processes in order to achieve maximal efficiency. One such process is described in U.S. Pat. No. 3,772,519 for a Method and Apparatus for the Separation of Isotopes by R. H. Levy et al. In this patent a method is disclosed for isotope separation in which an environment containing a plurality of uranium isotopes is radiated with laser radiation of a particular frequency to selectively excite the particles of the desired isotope type. When certain particles are selectively excited, the selectively excited particles may be separated as disclosed in the patent. For optimum efficiency, the laster isotope separation process, as shown in the Levy et al patent, prefers excitation radiation with energy distributed throughout the bandwidth of the absorption structure of the U-235 component of uranium vapor rather than the series of discrete mode frequencies typical of most laser radiation.

The subject invention also has application to atomic and molecular systems in which the exact position of the spectral components or transitions cannot easily be either calculated or verified experimentally. Uncertainty in spectral line position may occur through Doppler broadening, Zeeman shift or cross-coupling interactions not thoroughly understood.

In order to insure that optimal energy is available to provide a predetermined spectral interaction, it is oftentimes desirable that the spectral response of the laser be slightly broadened so as to accommodate either known or unknown shifts in the corresponding spectral line. In so doing multi-mode lasers may be given a virtually continuous frequency profile regardless of the modal nature of the output.

One way of achieving the even energy distribution is to "chirp" or sweep the frequency of the laser radiation, thereby moving the spectral line. In the isotope separation case this results in all portions of, for instance, the U-235 absorption band, being subject to resonant frequency laser radiation. Representative methods of causing such a chirp are shown in U.S. Pat. No. 3,611,182, issued to E. B. Treacy, involving the utilization of a rotating mirror, and U.S. Pat. No. 4,088,898, issued to M. L. Stitch which utilizes a rotating optical wedge which varies in thickness and presents the varying thickness to the optical path of the laser during the generation of a laser pulse. In this patent the optical wedge has an axis of rotation parallel to the input beam. The latter of these two patents is assigned to the assignee of the present application.

Additionally, broadening of the spectral response of multi-mode lasers is elaborated upon in copending U.S. patent application Ser. No. 862,409 filed Dec. 29, 1977 by Hans A. Bethe and Ching Sung Chang, the application also having been assigned to the assignee of this application.

With respect to the Treacy patent it will be appreciated that while the rotation of the mirror at the end of and optical cavity may vary the cavity length, it also deflects away a considerable portion of the radiation which is to be transmitted through the cavity. For systems which require considerable energy density, the deflection away of energy reduces the efficiency of the system.

With respect to the Stitch patent, this system operates satisfactorily for the purposes intended and is especially useful in isotope separation. It will be appreciated, however, that forming the optical wedge with a contoured surface requires complex optical glass working. Moreover, utilization of a large unbalanced mass may in some extreme cases produce shaft misalignment and vibration in which the beam may be deflected off axis as it passes through the wedge. Additionally, due to the configuration of the rotating wedge there is a possibility of introducing a lens effect (e.g. unwanted focusing) on the beam which passes through the wedge. This occurs when light impinges on the entire face of the wedge. In the Stitch patent, beam reducing and beam extending optics are provided so that the input beam only impinges on a small portion of the surface of the wedge.

SUMMARY OF THE INVENTION

The present invention involves an improvement over the generic concept defined in the Stitch patent in that an input beam is presented with a time varying thickness of a refractory means by using a translating optical wedge as opposed to a rotating wedge. Both the rotating and translating wedges provide a system for generating pulses of laser radiation varied in frequency with time to achieve a chirp or frequency sweep. In the subject system an optical wedge is moved transversely across an optical path utilized in the laser either as part of the laser cavity or as part of the path utilized in laser amplification.

The translation of the wedge with respect to the optical beam increases the optical path length either for a laser cavity or for the laser amplifier so as to provide a linear path length increase with time. This perturbs the wavelength of oscillation which results in the aforementioned linear chirp. In one embodiment, the optical wedge is mounted on a disc which has a central rotating shaft perpendicular to an input light beam as opposed to parallel to it, as described in U.S. Pat. No. 4,088,898. In effect the rotation of the disc provides that the wedge translates across the input beam. It is a feature of this system that the output beam exits the wedge always in the same direction. Unlike the wedge in the Stitch patent, wedges in the subject invention may have flat planar sides which are easier to form.

In a preferred embodiment pairs of optical wedges may be utilized, with the wedges being located on diametrically opposite sides of the rotating disc. The use of opposing closely identical wedges compensates for any beam position jitter introduced by shaft wobble, with any beam misalignment cancelled by the opposing wedge. Moreover, any non-linearity of sweep introduced by path length variations due to wobble will also be cancelled.

In another embodiment, whether using pairs of wedges or single wedges, each wedge is positioned at the point of minimum deviation. This point is defined as that point at which the half angle line is coincident with the centerline of the prism. This occurs when the entrant and exit rays form equal angles with the prism faces. At this point the angle of refraction is at a minimum which means that misalignments and wobble produces minimum effect on beam position and angle.

The subject invention may be utilized with any type of modelocked or unmodelocked laser so as to smear out or evenly distribute the frequency components in the output of the laser. As such it has particular application for injection locked lasers commonly utilized as laser amplifiers in a system which produces high power radiation so as to ionize preselected isotopic components.

As mentioned hereinbefore, when utilized for isotope separation for uranium enhancement, it is important that the sweep or chirp be accurately controlled so as to provide for the even distribution of energy about a central frequency. Moreover the sweep must be controlled in its chirp such that the band swept out is constrained. This is important so that closely adjacent spectra, for instance, of U-238, may be avoided.

BRIEF DESCRIPTION OF THE DRAWINGS

These and other advantages of the present invention are more fully set forth below in the following detailed description and in the accompanying drawings, of which:

FIG. 1 is a schematic and blook diagram illustrating the subject invention and showing the traverse motion of an optical wedge across an optical path of a laser;

FIG. 2 is a waveform diagram illustrating an envelope of mode lines generated by the laser of FIG. 1;

FIG. 3 is a waveform diagram illustrating the absence of mode lines after spectral smearings produced by the translating optical wedge of the subject invention;

FIG. 4A is a graph illustrating the linear sweep engendered by the translation of the subject optical wedge;

FIG. 4B is a graph illustrating the type of pulse produced by the subject laser and indicating its duration;

DETAILED DESCRIPTION OF THE INVENTION

Figure 5:
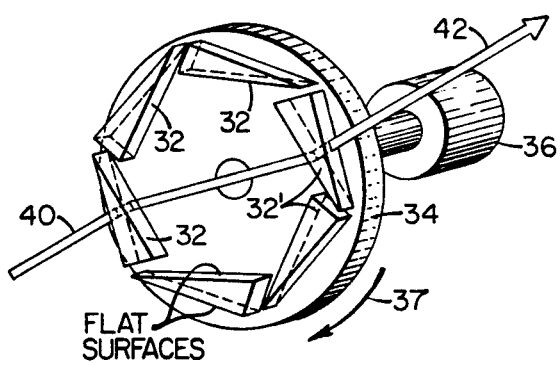
FIG. 5 is an isometric view of the subject invention illustrating the location of a number of diametrically opposed optical wedges on a rotating disc.

Referring now to FIG. 1, a laser 10 is provided with an optical loop 12 which is defined by totally reflecting mirrors 14, 16 and 18 at an output coupling mirror 20 which may be birefringent and in general typically passes 50 percent of the incident radiation and reflects the remaining 50 percent. The output of the laser is as illustrated by arrow 22.

Interposed into optical loop 12 is an optical wedge 24 which is mounted for translation across the optical loop.

For the present purposes, an optical wedge is a block of material having an index of refraction differing from the surrounding medium and is of varying thickness from one end to the other perpendicular to the direction of translation. In preferred embodiments, it may have straight planar sides which if extended would form an acute angle at the tip. As such the optical wedge may be in the form of a traditional prism, although the subject invention is not limited to the use of regular prisms.

The wedge is translated in the sense that the wedge presents a time varying thickness transverse to or across an optical path by a substantially linear motion, as opposed to a rotary motion. Note, the translational motion is transverse to the optical loop path as illustrated by arrow 26. It will be appreciated that if the angle of incidence at the leading face of the wedge is fixed, the refraction angle at the exit face will be constant. This applies as long as the wedge face always makes the same angle with respect to the incident beam during the traverse, assuming the prism at an angle of minimum deviation. The result is that the exit beam's position does not vary during the translation of the wedge across the beam.

The purpose of translating the optical wedge through the optical loop path is to elongate the loop path during the time that a laser pulse is generated by laser 10. The effect of path lengthening is illustrated in FIG. 2.

Referring to FIG. 2, for a class of lasers which operate in a multi-mode configuration, the output characteristic of the laser is a series of spectral lines which are closely spaced, with the distance between the lines being c/L, where c is the speed of light and L is the optical loop length. It is the purpose of the subject invention to displace the mode lines during the generation of a pulse so as to obtain spectral smearing, such as illustrated in FIG. 3 in which there is in effect a continuum of energy within the limits of the frequency output of the laser. As mentioned hereinbefore, the spectral smearing results in distribution of energy during the pulse so that no sought after transition or spectral line within these limits will be devoid of energy.

It will be appreciated that in most instances, the path length variation during the production of a 1 to 2 microsecond pulse is only on the order of a couple of angstroms so that the movement of the wedge need be only slight in order to produce the required mode line displacement.

Referring to FIG. 4A, it will be appreciated that with a uniform velocity wedge, a linear sweep will be accomplished during the pulse duration such as illustrated in FIG. 4B.

In one embodiment, laser 10 of FIG. 1 may be an injection-locked oscillator (ILO) which may be energized by a laser oscillator 30 as illustrated in FIG. 1. It will be appreciated that the wedge is moving such that the optical path length is increasing as a function of time. In this embodiment, the frequency spectrum of the laser pulse emission consists of a series of longitudinal mode lines separated in frequency by c/L, with the envelope of the laser emission spectrum being determined by the passband of the laser amplifying medium. As can be seen, the purpose of this invention is to move the line spectrum within the envelope so as to cover the whole bandwidth within the envelope.

A typical set of required parameters is to sweep several, say 10 lines through a point in the frequency domain during at typical ILO pulse. For each line to be swept, it is only necessary to increase the optical path length one wavelength in distance or one-half wavelength for a confocal cavity. Therefore, utilizing the illustrated ILO as an example, it is only necessary to increase the thickness of the optically dense medium, for instance glass, by 10 wavelengths to "chirp" across 10 mode lines. Assuming L equals length of beam travel through the wedge prism; d equals change of length in prism; N equals number of lines to be "chirped" (e.g. number of wavelengths produced by the ILO); n equals index of refraction of prism; and equals nominal wavelength of light on the laser pulse emission; then $$dl = n\delta/(n-1) \qquad \text{Equation 1}$$

It will be appreciated that the optical wedge need be moved only very slightly during the duration of the pulse so as to effectuate a chirp of the mode lines. One way of causing the translation is to mount a series of diametrically-opposed identical optical wedges on a disc. This is illustrated in FIG. 5.

Referring to FIG. 5, a number of diametrically-opposed oppositely-pointed, identical prisms 32 and 32' are spaced apart on a disc 34 driven by a motor 36. If the diameter of the disc is sufficiently large the prism will not rotate significantly with respect to the incident beam. Thus when the amount of disc rotation needed is sufficiently small, by rotating the disc as illustrated by arrow 36, the prisms will translate with respect to an incident beam 40 which passes through prism 32 and its corresponding diametrically-opposed prism 32'.

The disc assembly with the prisms may be mounted for rotation in the optical path of a laser such that the plane of rotation is parallel to the incident beam. With appropriately oriented pairs of prisms, it can be shown that the exit beam 42 is parallel to the incident beam 40. The use of pairs of prisms results in angular deviation cancellation and beam displacement cancellation, should there be significant wobble of disc 34.

As will be described hereinafter, if the incident beam impinges upon the prism at a so-called point of minimum deviation, angular deviation of the exit beam and beam displacement will be minimized.

Figure 6:
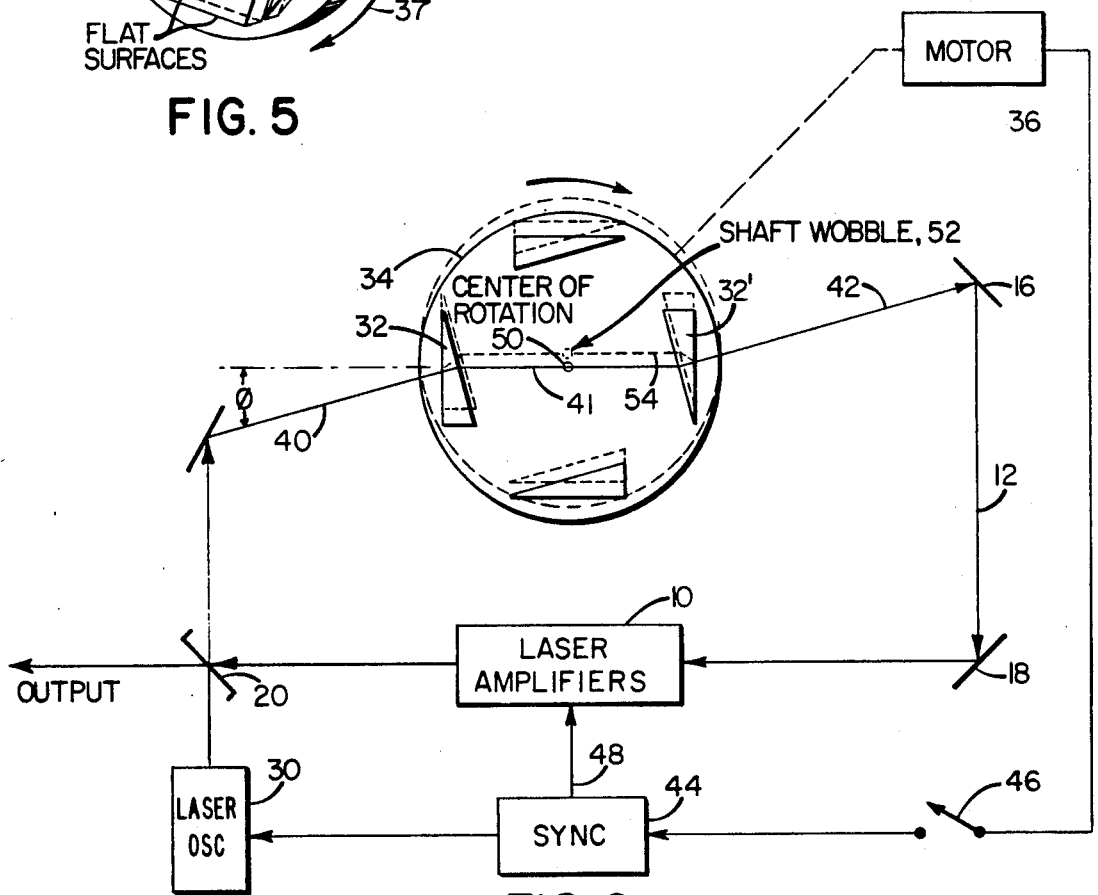
FIG. 6 is a schematic and block diagram illustrating the operation of the subject invention when utilized in a laser amplifier loop.

The subject system is depicted schematically in FIG. 6 in which corresponding elements of FIGS. 1, 5 and 6 carry like reference characters.

Before describing the operation of the error-cancelling aspect of the subject system, it will be appreciated that it may be desirable to synchronize laser oscillator 30 with the rotation of motor 36. For this purpose, a conventional syncing circuit 44 is switched into the system via switch 46, such that the laser oscillator and the laser amplifier are actuated to generate a pulse which may land anywhere on, for instance, a central one-quarter inch length of prism. In one embodiment, the prisms may be a half inch in length. Theoretically, if the prisms were laid end-to-end, it would not be necessary to synchronize the production of the pulse with the position of the wedges. However, as a practical matter, it is difficult mechanically to position the wedges end-to-end, and, even though in one embodiment 18 wedges are utilized, synchronization appears to be desirable. As with many laser amplifiers, synchronization for the energizing flashlamp of the laser amplifier may be necessary, and this is provided over line 48.

As can be seen, the incident beam 40 makes an angle $\phi$ with respect to a normal to the leading surface of prism 32. This angle is preserved by the exiting beam 42 as described hereinbefore. Should the shaft wobble such that the center of rotation 50 is displaced as shown by arrow 52 in the upward direction. Then the prisms on the disc are likewise displaced upwardly. This means that for prism 32 the beam will transit more of the wedge and therefore exit above beam 41, which is the beam formed with no wobble. This displaced beam is illustrated at 54. As illustrated, prism 32' is also displaced upwardly and beam 54 therefore traverses less of this prism. Because of the shorter traverse beam 54 exits at exactly the same point as beam 42. Thus prism 32' cancels any position jitter caused by wobble (translation) of prism 32. This produces an exceptionally linear frequency shift.

Figure 7:
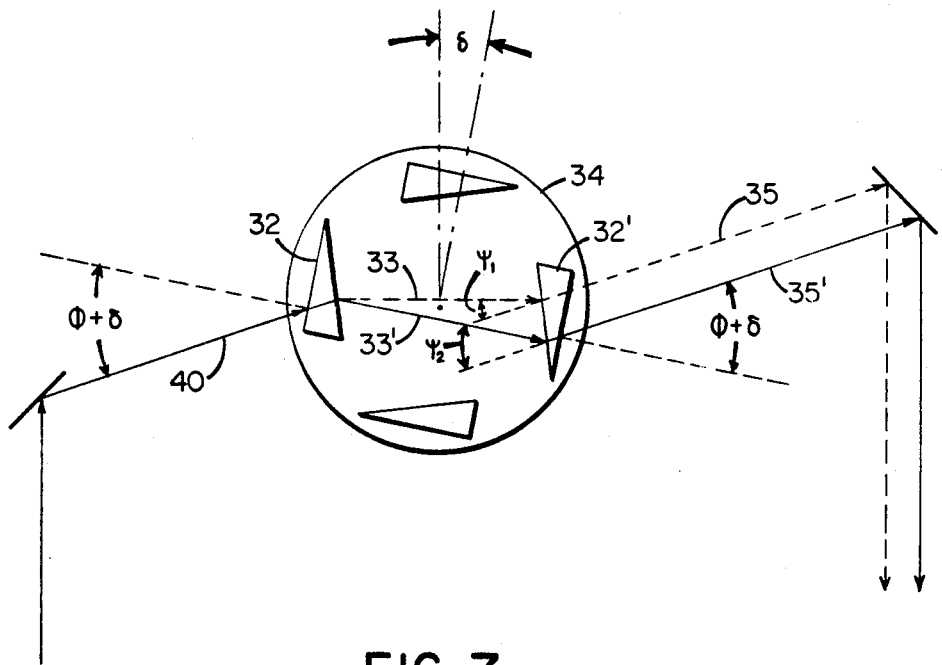
FIG. 7 is a schematic and diagrammatic illustration of angular deviation cancellation when utilizing the diametrically opposing wedge structure.

More importantly, any angular deviation due to any rotation of wedge 32 with respect to the incident beam is cancelled by prism 32'. This is illustrated in FIG. 7. As disc 34 rotates, the angle of incidence will change such that, for instance, the angle of incidence may increase by small amounts. Ordinarily, this would result in a beam 33' deflected from original position 33.

The angular error between beams 33 and 33' as measured from normals to prism 32' is $\Psi_2 - \Psi_1 = \epsilon$. This error is cancelled by prism 32' such that the exit angle is $\phi + \delta$, which is the angle of incidence. This results in exit beam 35' being parallel to exit beam 35, howbeit slightly displaced. If angular error $\epsilon$ were allowed to build up, aiming errors would accumulate. Beam displacement of such a small amount is negligible, and is zero if the system is operated at the point of minimum deviation, as will be described.

Thus, with a slight increase or decrease in the angle incidence, it is a feature of the subject invention, that when utilizing prism pairs, the second prism cancels out the error caused by the change in incidence angle, such that angular deviation is completely eliminated. This effect is important in maintaining the exit beam angle and improves not only aiming accuracy but efficiency of the entire system. This is particularly important when, for instance, the system is utilized for isotope separation.

Figure 8:
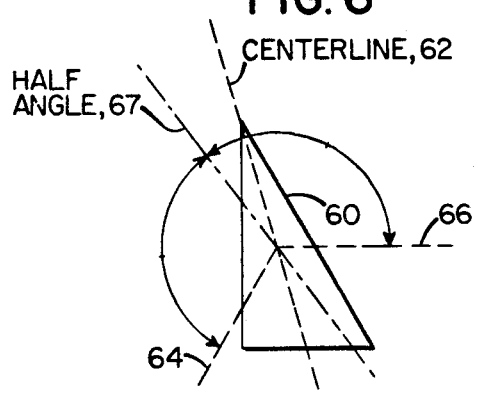
FIG. 8 is a diagrammatic illustration of an optical wedge illustrating the relationship between the center line of the wedge and the half angle formed between incident and exiting beams, the point of minimum deviation being that point at which the half angle line is coincident with the center line of the wedge.

Referring now to FIG. 8, if wedges are to be utilized either singly or in pairs, it is useful to position the incident beam such that the system operates at a point of minimum deviation. This means that for any change in position or angle of the incident beam, there will be a minimum of angular deviation or displacement of the exiting beam in relation to the entrant beam.

In effect, the system is made less sensitive to misalignment errors and wobble by virtue of initializing the system at the point of minimum deviation. Minimum deviation is defined as follows. Assuming a wedge 60 has a center line 62, as illustrated, and assuming that the angle between an incident beam 64 and an exit beam 66 is also as illustrated, then the half angle 67 is defined to be half the angle subtended by beams 64 and 66. The system is said to be operating at the point of minimum deviation when the orientation of the incident beam with respect to the wedge is such that the half angle line is coincident with the center line. This constraint is useful whether the subject wedge is translated or rotated so as to effect translation and produces an output beam which is very little affected by wobble or vibration of the subject apparatus.

As mentioned hereinbefore, positioning the wedge at the point of minimum deviation is useful whether or not pairs of prisms are utilized. Thus the subject invention includes this orientation technique for single prism or paired prism applications.

In a typical arrangement, as many as 18 prisms one-half inch in length, may be located about a disc which has a radius of 10 centimeters. Assuming $dT$ = pulse duration; $P$ = number of prisms in circle/number of prisms traversed by the beam; $r_o$ = radius of prism center position; $R$ = repetition rate of laser; and $c$ = circumference traveled/second = $2r_oT$.

Then the slope or wedge of the prism equals:

$$\frac{dl}{cdT} = \frac{N\lambda P}{(n-1)2\pi r_o dT} \quad \text{Equation 2:}$$

Note, in the system utilizing pairs of prisms, the combined prism thickness will have changed N wavelengths during the firing of a pulse.

It is a feature of the subject system that the shaft rotation rate can be made quite slow by the number of prisms put on the assembly. In general, $$RPM = \frac{\text{rep. rate} \times 60}{\text{number of prisms}} \quad \text{Equation 3:}$$

Assuming $n = 1.7$; $N = 10$; $1 = 0.6 \times 10^{-4}$ cm; $P = 20/2 = 10$; $R = 200$ pps; $dT = 5$ microseconds; and $r_o = 10$ cm, then the slope of the wedge = 0.136 or the angle of the wedge = 7.77°.

With a system operated at the minimum deviation position, it is not necessary to have a second prism to transmit through if the rotation can be closely controlled. If it is undesirable to closely control the rotation, it is possible with prism pairs to reduce shaft position requirements, since the second prism in the pair removes any jitter introduced by the first prism. Of course, since both prisms are operated at minimum deviation positions, the effect of beam jitter is minimized, and therefore, close tolerances need not be observed.

It will also be appreciated that since the sides of the wedges are optically flat, these configurations are exceptionally easy to obtain, and angular misalignment of the prisms on the disc may be minimized because of the regular features of the prism.

Moreover, it should be noted that this method of path elongation and frequency chirping results in very little loss to the system. It is now possible that the insertion loss for the subject chirping system can be limited to 0.2%.

It can be seen that while the novel method of sweeping the frequency of radiation from a laser or other source of electromagnetic energy has been described in conjunction with an injection-locked oscillator, this method is equally applicable to other optical path length, frequency dependent sources of radiation. Accordingly, the preferred embodiment described herein is not to be construed as limitation upon the invention; and the present invention is only to be limited as indicated by the appended claims.

What is claimed is:

1. A system for providing electromagnetic radiation of time varying frequency comprising:
   a source of electromagnetic radiation of substantially fixed frequency;
   means for directing the radiation from said source along a path;
   a material of varying thickness having an index of refraction different from that of the surrounding environment, at least a portion of the material being wedge-shaped;
   a support;
   means for orienting said material on said support such that the angle of incidence that said path makes with a surface of said material is such that the half angle and the center line of the wedge-shaped portion coincide, whereby said system operates at the point of minimum deviation; and,
   means for moving said support such that said material moves transversely across said path for varying as a function of time the length of said path and thus the speed of propogation of said electromagnetic radiation along said path.

2. The system of claim 1 wherein said support has at least one plane surface, and further including means for mounting said material on said plane surface and means for rotating said support such that said plane surface is parallel to said path and such that said material translates across said path with the rotation of said support.

3. The system of claim 2 wherein said material includes at least a pair of optical wedges mounted on diametrically opposite sides of said support for rotation in opposite directions.

4. The system of claim 3 wherein said wedges are substantially identical.

5. The system of claim 4 wherein said wedges are mounted with points going in opposite directions.

6. The system of claim 1 wherein said source of electromagnetic radiation is a pulsed laser.

7. The system of claim 6 wherein said moving means includes means for causing said material to traverse said optical path in timed relationship to the production of pulses from said laser.

8. The system of claim 7 wherein material is in the form of an optical wedge and wherein said support includes a disc, said wedge being mounted on said disc, and means for mounting said disc for rotation such that the plane of said disc is parallel to said path.

9. The system of claim 8 and further including a second optical wedge mounted in diametric opposition to said first mentioned wedge with the tips of said wedges pointing in opposite directions.

10. The system of claim 9 wherein said wedges are substantially identical.

11. The system of claim 8 wherein the faces of said optical wedge which form an acute angle are perpendicular to the plane of said disc.

12. Apparatus for providing electromagnetic radiation having a time varying frequency comprising:
   a source of electromagnetic radiation;
   an optical wedge;
   means for orienting said optical wedge such that the angle of incidence of said radiation on a surface of said wedge is such that the half angle and the wedge centerline coincide such that said apparatus operates at the point of minimum deviation; and, means for moving the optical wedge transversely across radiation from said source such that radiation from said source passes through a time varying thickness of said wedge for altering the path length of the radiation passing through said wedge.

13. The apparatus of claim 12 wherein said source of electromagnetic radiation includes a laser.

14. The apparatus of claim 13 wherein said laser is pulsed and wherein said wedge is moved in timed relationship to the production of a pulse from said laser.

15. The apparatus of claim 13 wherein said laser includes an injection-locked oscillator.

16. The apparatus of claim 13 wherein said laser includes means for directing electromagnetic radiation around a closed path and wherein said wedge is translated across said closed path.

17. The apparatus of claim 16 and further including an injection-locked oscillator interposed in said closed path.

18. The apparatus of claim 13 wherein said laser is a single mode laser.

19. The apparatus of claim 13 wherein said laser is a multi-mode laser.

20. The apparatus of claim 19 wherein said laser is mode-locked.

21. A method of providing a mode line shifted continuous energy spectrum for lasers operating in one or more modes comprising the step of:

translating an optical wedge across one of the optical paths of said laser thereby to elongate the path for shifting a mode line in a time varying fashion, said path and said optical wedge being oriented such that the half angle and center line of the wedge coincide, whereby the mode line shift is provided at the point of minimum deviation for the wedge-path combination.

22. A method of providing an angular deviation compensated frequency shifting system for use with lasers comprising the steps of:

mounting optical wedges in diametric opposition on a disc; and mounting the disc for rotation such that said prisms traverse an optical path of said laser when said disc is rotated, whereby said prisms elongate said path in a time varying fashion to frequency shift the output of said laser, while at the same time compensating for angular rotation with respect to said path.

23. The method of claim 22 and further including the step of providing that said path makes an angle with one of said wedges such that the system operates at the minimum deviation angle when said one wedge is traversing said path.

24. A method of providing a beam position deviation correction system in a system for optically frequency shifting the output of a laser comprising the steps of:

mounting prisms in diametric opposition on a disc; and mounting the disc for rotation such that said wedges traverse an optical path of said laser with the rotation of said disc, whereby said wedges elongate said path in a time varying fashion to optically frequency shift the output of said laser while at the same time compensating for beam position deviation.

25. The method of claim 24 and further including the step of providing that said path makes an angle with one of said wedges such that the system operates at the minimum deviation angle when said one wedge is traversing said path.

26. A method for increasing the efficiency of an isotope separation process, so as to couple more radiation of an appropriate predetermined frequency spread into a predetermined region occupied by isotope components, comprising the step of:

irradiating said isotope components with a pulsed beam of electromagnetic radiation with smeared out mode lines in which the smearing is accomplished by translating an optical wedge across the beam during production of the pulse, said wedge being oriented to said beam such that the half angle and wedge center line coincide, whereby the beam-wedge combination operates at the point of minimum deviation.

27. The method of claim 26 wherein said smearing is accomplished by spaced apart optical wedges pointing and translating in opposite directions.

28. Apparatus for providing electromagnetic radiation having a time varying frequency comprising:

a source of electromagnetic radiation;

a pair of spaced apart oppositely pointed optical wedges; and means for moving the optical wedges in opposite directions across the radiation from said source such that radiation from said source passes through time varying thicknesses of said wedges, at least one wedge being oriented to said radiation such that the half angle and wedge center line thereof coincide.

29. The apparatus of claim 28 wherein said wedges are substantially identical.

30. Apparatus for providing electromagnetic radiation having a time varying frequency comprising:

a source of electromagnetic radiation;

a pair of spaced apart oppositely pointed optical wedges; and, means for moving the optical wedges in opposite directions across the radiation from said source such that radiation from said source passes through the varying thicknesses of said wedges, said moving means including a disc, said wedges being mounted on diametrically opposite sides of said disc, with corresponding sides of said wedges making the same angle with the diameter on which they lie.

31. Apparatus for providing a radiation chirp comprising:

an active medium and means for exciting the medium to a lasing condition;

means defining a radiation path of an effective length for repeatedly reapplying to said medium lasing radiation generated thereby; and, means in said radiation path comprising a pair of oppositely directed optically dense wedges and a support therefor, and means for moving said wedges over time in opposite directions by rotation of said support for including in said path a distance through said wedges which varies over time, thereby to vary over time the effective length of said path and chirp the radiation from said medium.

32. The apparatus of claim 31, wherein said path and one of said optically dense wedges are oriented such that the half-angle and center line of the wedge coincide.

33. A system for providing electromagnetic radiation of time varying frequency comprising:
a source of electromagnetic radiation of substantially fixed frequency;
means for directing the radiation from said source along a path;
a pair of oppositely directed optical wedges; and, means including a support rotatable about an axis perpendicular to said path for moving said wedges in opposite directions transversely across said path, said wedges being mounted on diametrically opposite sides of said support such that a time varying thickness of material is presented to said path for varying as a function of time the path length and thus the speed of propogation of said electromagnetic radiation along said path.

* * * * *